RAYMOND C. COATS
DALLAS R. COATS
INVENTOR.

ATTORNEY

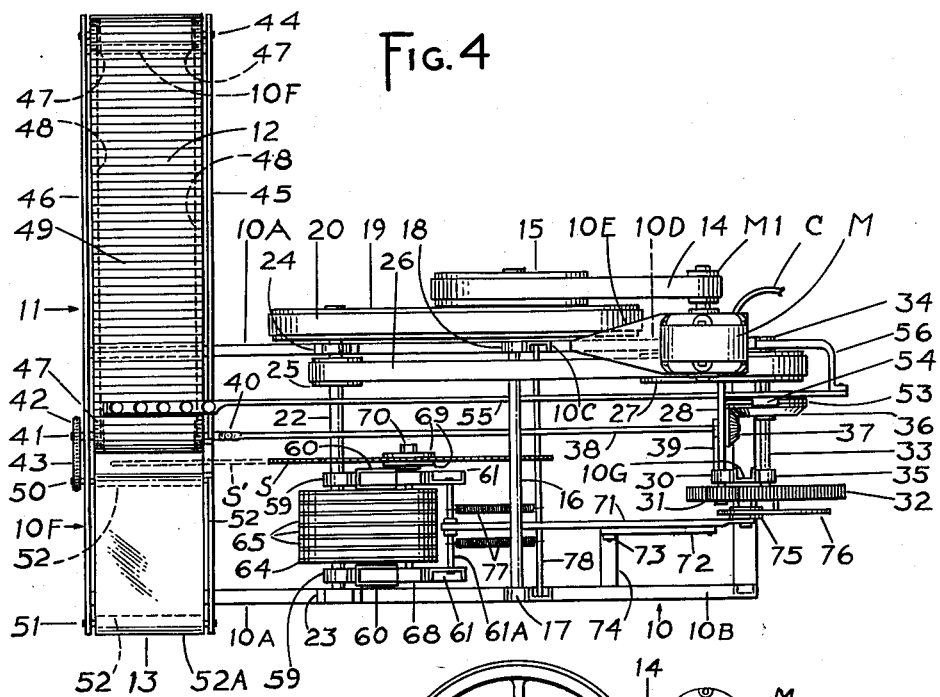
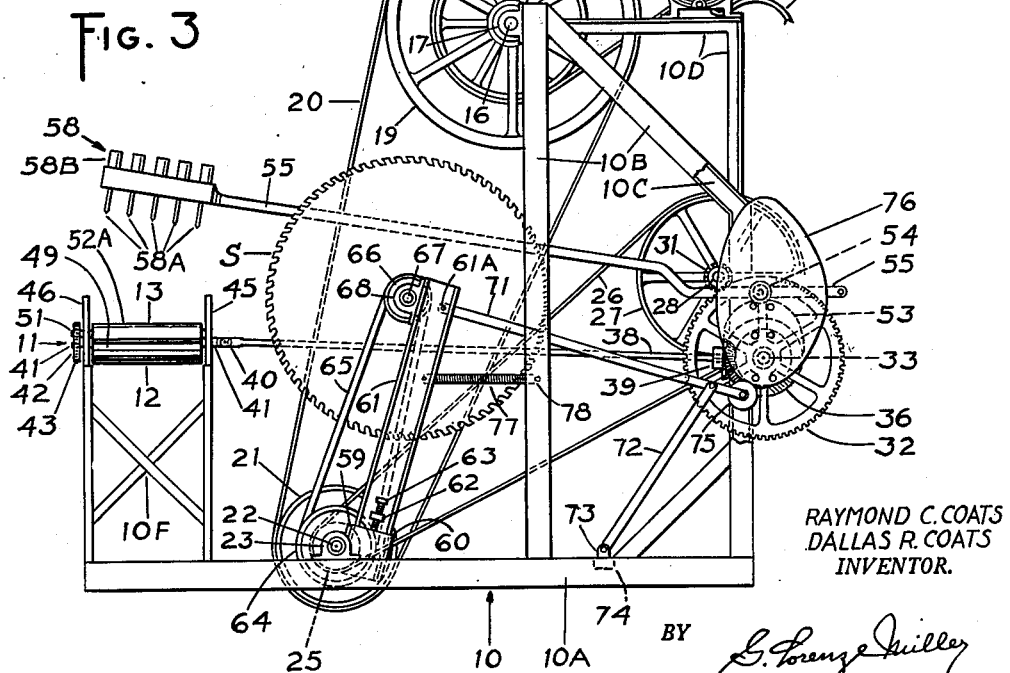

Oct. 21, 1952
R. C. COATS ET AL
2,614,589
AUTOMATIC INTERMITTENT FEED-AND-CUT
MACHINE FOR SAWING FIREWOOD
Filed March 21, 1951
3 Sheets-Sheet 3
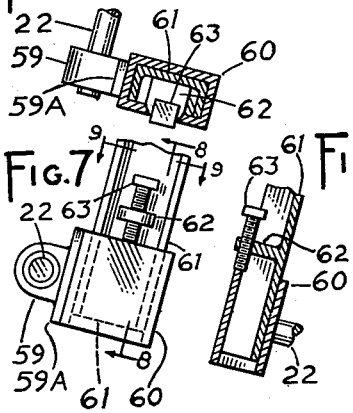
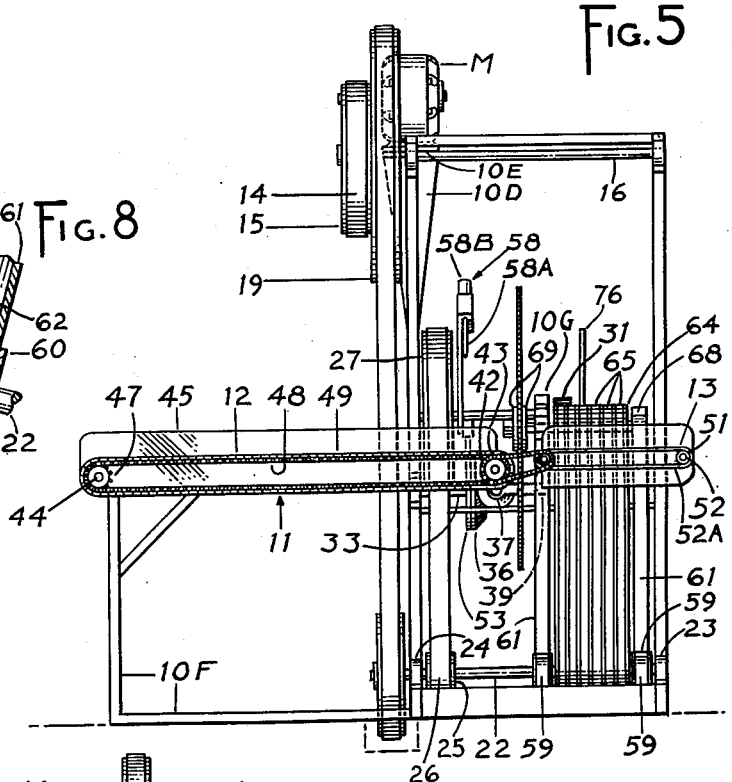
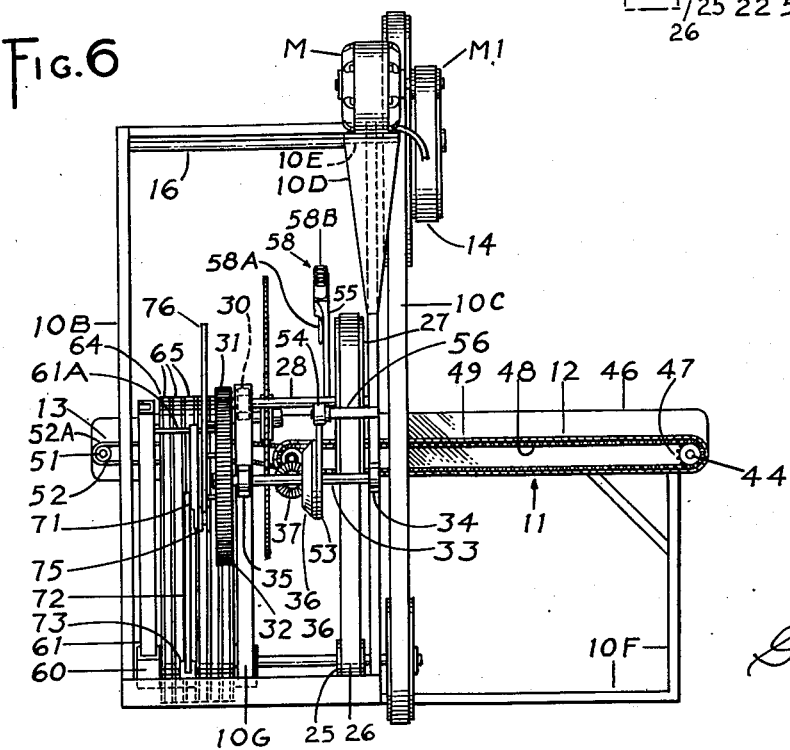
RAYMOND C. COATS
DALLAS R. COATS
INVENTOR.
ATTORNEY Patented Oct. 21, 1952

2,614,589

UNITED STATES PATENT OFFICE 2,614,589

AUTOMATIC INTERMITTENT FEED-AND-CUT MACHINE FOR SAWING FIREWOOD

Raymond C. Coats and Dallas R. Coats, Effingham, Ill.

Application March 21, 1951, Serial No. 216,724

1 Claim. (Cl. 143—46)

The present invention relates to a machine for sawing and handling relatively small logs, miscellaneous boards and the like, for firewood, etc.

Heretofore the sawing of such material into suitable lengths for use required considerable labor for placing the wood in contact with the saw, moving it along for successive cuts, and then removing it to make room for other wood to be sawed. By such procedure, from two to three workmen have been necessary in order to produce a suitable quantity of sawed wood within a reasonable time, for example, it has taken one workman to place or load the wood before the saw, another to hold the wood in position while being sawed, and still another to remove it after the cut is made, and this has been particularly true where several pieces were sawed at one time.

The time and labor burden embodied in the method above described is very great and the cost thereof is far out of proportion to the margin of profit to be had therefrom, and these expensive operation factors have resulted in the development of this invention.

An object of the present invention, therefore, is to provide a machine such as above mentioned, for sawing wood, thereby eliminating the expenditure of excess time and labor.

Another object is to provide a machine of continuously automatic operation from the loading end to the discharge end thereof, and which serves to feed, hold, saw and discharge the wood as it operates.

A further object is to produce an efficient and practical device not only simple in construction and arrangement of parts, but also a unitary assembly complete in itself, including electric motor and on-and-off switch elements, it being necessary only to suitably set the machine in position for operation, and then connect the electric cable from its motor to the usual conventional electric power source, not shown.

The only other requirement for installation of the machine is the provision of a small excavation directly at the location of the lower belt driven pulley mounted on and outwardly of one side of the lower part of the frame structure.

It is to be understood that the structure, arrangement, and proportion illustrated in the drawings showing the present invention are essentially schematic, and are not in any sense intended as a limitation thereof.

Other objects and advantages to be attained will appear in the following description and the accompanying drawings, in which;

Figure 1 is a side elevational view showing the disc saw in retracted position as when either idle or out of engagement with the logs L on the conveyor element, and with the log holder bar in raised position, as to release the logs L;

Figure 2 is a view similar to Figure 1, but with part of one side of the frame structure removed to reveal more clearly the mechanism, and showing the disc saw in position as having cut through the logs L, while the log holder element is shown as holding the remaining uncut logs in position, before it is raised for the operation of the conveyor element for moving the logs along to the next position for sawing;

Figure 3 is an elevational view of the opposite side of Figure 1;

Figure 4 is a top plan view of Figure 3, the dotted lines S' indicating the foreward position of the disc saw during the cutting operation;

Figure 5 is a front elevational view, but with the foremost sideboard of the conveyor element removed to show the actual conveyor belt and its sprocket wheels;

Figure 6 is a rear elevational view, with the rearmost sideboard of the conveyor element removed;

Figure 7 is an enlarged fragmentary detail view of the shaft, bearing member, and adjustment means at the lower end of the reciprocating members which carry the saw;

Figure 8 is a transverse sectional view taken on the line 8—8 of Figure 7, and,

Figure 9 is a top plan view, partly in section, taken on the line 9—9 of Figure 7.

Figure 1:
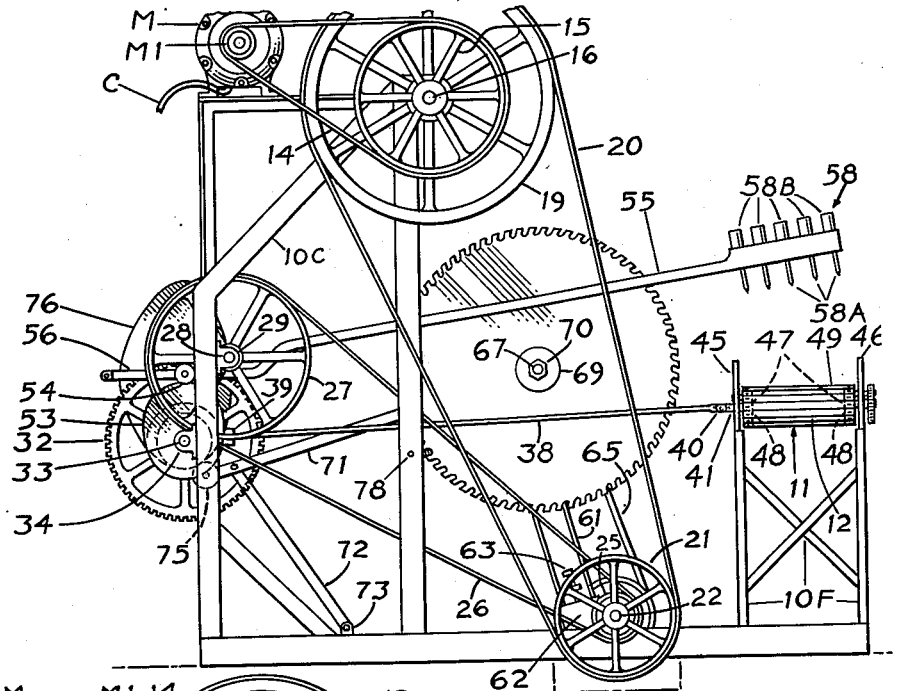

Referring now, to the accompanying drawings in detail, the unitary frame assembly 10 is formed generally of channel iron, comprising the horizontally disposed substantially rectangularly shaped frame portion 10A and the identically shaped oppositely and vertically disposed frame portions 10B and 10C. Mounted on the frame portion 10C is the right-angularly formed bracket portion 10D having the flat forwardly tapered plate member 10E (Figs. 5 and 6) adapted to support the electric motor M from which extends the electric cable C provided with an electric connecting plug, not shown, for the purpose of supplying electric power from any suitable source to the motor M to operate the machine.

Arranged forwardly and laterally of the frame portion 10A, and extending a substantial distance out from one side thereof is the frame structure 10F supporting the general conveyor element 11 comprised of the loading section 12 and the discharge section 13 adapted for co-operative intermittent operation as will herein later be more fully explained.

In one embodiment of my invention the motor M is mounted as shown in the drawings, its driving pulley M—1 engaging the belt 14 to drive the pulley 15 fixedly mounted on the outer end of the drive shaft 16 operating in the bearing members 17 and 18 (Fig. 4) suitably mounted adjacent the top and on the front face of the frame portions 10B and 10C respectively.

The pulley 19 is also fixedly mounted on the drive shaft 16 adjacent and inwardly of the pulley 15 and engages the belt 20 which in turn drives the pulley 21 fixedly mounted on the outer end of the shaft 22 operating in the bearing members 23 and 24 which are suitably mounted on the frame portion 10A—see Figures 3, 4 and 5.

It is here noted as obvious that the pulley 19 being of substantially larger diameter than the pulley 15 tends to increase the R. P. M. of said pulley and shaft 22. The pulley 25 fixed on the shaft 22 engages the belt 26 which drives the pulley 27 fixed on the shaft 28 operating in the bearings members 29 and 30—see Figures 1 and 4—suitably mounted respectively on the forward face of the frame portion 10C and the vertical channel member 10G fixedly mounted on the rearmost lateral member of the frame portion 10A—see Figures 4, 5 and 6.

The pinion 31 fixed to the inner end of the shaft 28 is adapted to engage and drive the gear 32 fixed on the inner end of the shaft 33 which operates in the bearing members 34 and 35 suitably mounted on the rearward face of the frame portion 10C and the vertical channel member 10G respectively. Also fixed on the shaft 33 is the bevel gear 36 positioned to drive the bevel pinion 37, fixed on the rearmost end of the substantially long shaft 38 which is journaled in the supporting member 39 suitably mounted on the forward face of the vertical channel member 10G.

It is here noted that the bevel gear 36 has gear teeth on only one-quarter segment of its bevelled surface, so that in its operation it engages and drives the pinion 37 only intermittently, thus effecting the intermittent operation of the loading section 12 and the discharge section 13 for the purpose which will be later more fully explained.

On the forward end of the shaft 38 is fixed the universal joint 40 engaging the drive shaft 41 forming a component part of the loading section 12 of the conveyor element 11 as will later be explained. Fixed on the opposite end of the drive shaft 41 is the drive gear 42 engaging the drive chain 43 adapted to operate the discharge section 13 of the conveyor element 11 which will also later be explained.

At the outer end of the loading section 12 the idler shaft 44 is suitably mounted on and between the sideboards 45 and 46. On the idler shaft 44 and on the said drive shaft 41 a pair of sprocket wheels 47 are spaced apart to engage a pair of link type conveyor chains 48, each link of which carries one end of each of a series of flat relatively narrow hardwood slats 49 forming an endless conveyor belt comprising part of the loading section 12.

At the inner end and the outer end of the discharge section 13 the drive shaft 50 and the idler shaft 51 respectively are suitably mounted on and between the sideboards 45 and 46. On this drive shaft 50 and on the idler shaft 51 a pair of roller members 52 are mounted, and they engage the endless conveyor belt 52A comprising part of the discharge section 13.

Fixedly and suitably mounted on the rear face of the bevel gear 36 is the cam member 53 adapted to engage around its peripheral edge the roller 54 mounted by suitable pins means on one side of the holder bar 55 which is pivotally engaged at its rearmost end by the supporting arm member 56 welded or otherwise suitably secured to the rear face of the frame portion 10C to enable the raising and lowering of the holder bar 55. The forward end of the holder bar 55 has the form of an elongated body substantially deeper and broader than the holder bar proper, and is provided with a plurality of spaced apart through holes 57 (Fig. 2) vertically and alignedly positioned to slidably engage a corresponding number of spindle members 58, each of which comprises a pointed pin-like lower part 58A and a relatively broad and deep upper part 58B, the part 58A of these spindle members 58 being capable of free substantially vertical movement within the holes 57.

Two bearing members 59 are suitably mounted on the hereinbefore mentioned shaft 22, and each of these bearing members 59 is suitably secured by its base flange portion 59A to a rectangularly formed sleeve member 60—see Figures 7, 8 and 9 for details—adapted to snugly yet slidably engage a channel member 61 having an integral outwardly projecting lug portion 62 adapted to threadably engage an adjusting screw member 63 the bottom end of which bears against one top edge of the sleeve member 60 to adjust the position of the channel member 61 within the sleeve member 60 for the purpose hereinafter explained.

Suitably mounted on the shaft 22 and positioned between the sleeves 60 is the multiple-grooved V belt type pulley 64 adapted to engage and drive a plurality of V type belts 65 which engage and drive the multiple-grooved V belt type pulley 66 suitably mounted on the shaft 67 operating in the bearing members 68 suitably secured to the foreward face and adjacent the upper end of the channel members 61. The inner end of the shaft 67 is suitably threaded to receive first the threaded flange member 69, then the disc type buzz saw S and another flange member 69, and finally the threaded locknut 70, thus comprising an arrangement for mounting and enabling the normal operation and reciprocal movement of the saw S, said reciprocal movement being accomplished by means of the rocker-bar 71 pivotally secured to the cross-bar 61A spanning and fixedly secured to the channel members 61, while the movement of the rearmost end of said rocker-arm is governed by its pivotal engagement, adjacent said rearmost end, with the reciprocating arm 72 which is pivotally engaged at its lower end by the upwardly projecting lug 73 on the inwardly projecting supporting arm 74 fixedly secured to the inner face of the frame portion 10A. Mounted on the extreme rearmost end of the rocker-bar 71 is the circumferentially grooved wheel member 75 adapted to roll around the peripheral edge of the cam 76 mounted by bolts or other suitable means on one face of the gear 32, and it will appear obvious that the sustained rolling contact of the grooved wheel member 75 with and around the edge of the cam 76 is effected by means of the twin coil springs 77 mounted on and between the cross-bar 61A and the cross-bar 78 spanning and fixedly secured to the frame portions 10B and 10C.

Now, in actual practice, the necessary connection being made between the cable C and a suitable electric power source, the motor M sets in motion the entire mechanism of the invention, and the operator is required merely to place the logs L on the loading section 12, which, being operated by the revolving of the shaft 38, moves the logs into position across the relatively narrow saw space between the loading section 12 and the discharge section 13 at which point the bevel gear 36 turns in its cycle to that portion within which it has no teeth, with the result, of course, that the bevel pinion 37 is not engaged and therefore does not revolve the shaft 38, which stops the operation of the loading section 12 and the discharge section 13 until the bevel gear 36 again revolves to the point where the section having the teeth again engages and revolves the shaft 38.

Figure 2:
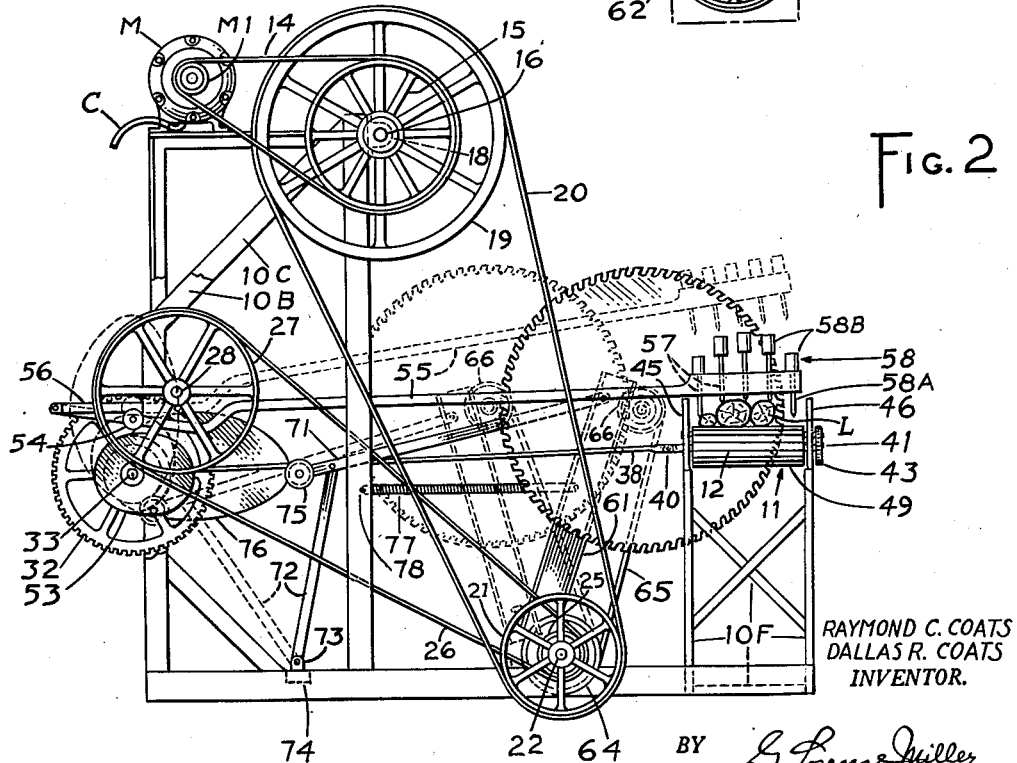

In the interval during which the sections 12 and 13 are stopped, the saw S being mounted and arranged for reciprocal movement as described and as shown particularly in the Figures 2 and 4, is moved forwardly into the open saw space between the sections 12 and 13, to saw up the logs L which have been there placed as above described. The saw then returns to its original position until the logs L are again moved up into position to be sawed. It is obvious that the discharge section 13 moves the sawed-up portions of logs away from the saw to discharge them into whatever receptacle or vehicle may be provided to receive them.

The operation and reciprocal movement of the saw S is accurately adjusted to correlate with that of the loading and discharge sections.

It will be seen from reference to the drawings that when the cam 76 is in the position shown in Figure 3, for example, the saw S is then in retracted position, and that when the cam 76 is in the position shown by the full lines by which it is designated in Figure 2, the saw S is in advanced or cutting position.

The tension of the V type belts 65 may be regulated by means of adjusting the set screw 63 in the lug 62, the bottom end of the set screw 63 bearing against one top edge of the sleeve 60, and it is obvious that in turning the set screw 63 down against said top edge of the sleeve 60 the effect is to lengthen the channel 61 and thus tighten the belts. By reverse procedure the belt tension may be lessened if desired.

Mounted fixedly on the back face of the bevel gear 36 is the cam 53, the peripheral edge of which is adapted to engage the wheel member 54 on the holder-bar 55, and when the cam 53 is in the position shown in Figure 3 the holder-bar 55 is raised to the position out of contact with the logs L until the machine against brings the logs up to a stopped position before the saw S on the sections 12 and 13, at which time the cam 53 has been rotated to the position shown by the full lines in Figure 2. The dotted lines generally of Figure 2 designate the position of the mechanism when the saw S is in retracted position. The twin springs 77 retain the saw and its supporting mechanism in retracted position until the operation of the machine propels it forwardly into cutting position.

The arrangement of the spindle members 58 and the yieldable, yet downwardly tending action thereof accomplishes the secure holding in position of various sizes of logs being sawed and the peculiar structure and arrangement of parts in the present embodiment of our invention effects not only a great saving of time and labor, but also imparts to the invention a strong safety factor apparent to those skilled in the art.

Obviously, modification and change may be made both in the construction and arrangement of parts of our improved unitary device for handling and sawing wood without departing from the spirit of the invention as defined in the appended claim. The invention is not, therefore, limited specifically to the construction and arrangement shown in the accompanying drawings.

What is claimed is:

An automatic machine for handling and sawing logs comprising a unitary frame assembly having an elongated substantially rectangularly shaped and horizontally disposed main frame portion, a secondary frame portion having a relatively narrow and elongated shape formed integral with and extending laterally from one side of the main frame portion, laterally disposed slat type conveyor belt means suitably mounted alignedly on the secondary frame portion and formed in two sections arranged so that a relatively narrow space separates them and into which space the saw moves in operation, one section being of substantial length and to serve as the loading section while the other section is of relatively shorter length to serve as the discharge section, a vertically disposed superstructure having two oppositely disposed side portions of substantially like size and proportion and adapted to carry part of the mechanism of the machine therebetween, power transmitting means carried by the superstructure and adapted to transmit power to a main shaft suitably mounted on the main frame portion, a pair of upwardly projecting spaced apart reciprocating members suitably mounted on the main shaft, suitable bearing means adjacent the upper end of the reciprocating members for mounting thereon a saw carrying shaft, means on the saw carrying shaft for mounting a disc type buzz saw, a multi-grooved V-type pulley member suitably mounted on said main shaft between the reciprocating members, a relatively smaller multi-grooved V-type pulley member suitably mounted on said saw carrying shaft, a plurality of V-type belts engaging the two said V-type pulley members for operating the saw, a secondary shaft suitably mounted on the superstructure and means on the main shaft for transmitting power to the secondary shaft, a pinion on the secondary shaft adapted to transmit power to a third shaft suitably mounted on the superstructure, a relatively large gear on the third shaft adapted to be driven by said pinion on the secondary shaft, a relatively large cam fixedly secured to the gear and adapted to be revolved thereby, a rocker-bar suitably pivotally connected to the reciprocating members and to a reciprocating arm which is suitably pivotally connected to the main frame portion, a roller member suitably mounted on said rocker-bar and adapted to engage the peripheral edge of said large cam to effect the reciprocal movement of the saw, spring means connecting the reciprocating members and the superstructure to yieldably maintain the saw in retracted position, a bevel gear mounted on the third shaft, said bevel gear having teeth on only a one-quarter segment of its circumference, a drive shaft suitably arranged for connection by a universal joint with said conveyor means and by pinion means with the bevel gear to effect the intermittent operation of the conveyor means, a smaller cam fixedly secured to one face of the bevel gear, a log holder member pivotally mounted on the superstructure and extending longitudinally of the machine to a position of suspension just above said relatively narrow space between the said two sections of the conveyor belt means, a roller member suitably mounted on the log holder member and adapted to engage the peripheral edge of said smaller cam to raise and lower said holder member, a plurality of alignedly positioned and substantially vertical through holes in the free end of the holder member, a pin-type holder element slidably mounted in each of said holes and having a weighted portion integrally mounted on the top of the pin-type holder element to yieldably secure the position of the logs during the sawing operation.

RAYMOND C. COATS.
DALLAS R. COATS.

REFERENCES CITED

The following references are of record in the file of this patent:

UNITED STATES PATENTS

| Number | Name | Date |
|---|---|---|
| 189,628 | Kautz | Apr. 17, 1877 |
| 410,777 | Abbott | Sept. 10, 1888 |
| 764,717 | Foshee | July 12, 1904 |
| 2,497,488 | Cashwell | Feb. 14, 1950 |

FOREIGN PATENTS

| Number | Country | Date |
|---|---|---|
| 354,228 | France | July 21, 1905 |
| 104,894 | Austria | Dec. 10, 1926 |
| 539,365 | Germany | Nov. 27, 1931 |